United States Patent [19]

Kemper

[11] 4,094,789
[45] June 13, 1978

[54] SULFUR GAS REMOVING AND SOLID PARTICLE FILTER FOR WELL WATER

[76] Inventor: Ronald J. Kemper, R.R. #7, Defiance, Ohio 43512

[21] Appl. No.: 778,783

[22] Filed: Mar. 17, 1977

[51] Int. Cl.² ................ B01D 19/00; B01D 27/00
[52] U.S. Cl. .................... 210/188; 55/174;
     55/201; 210/218; 210/238; 210/282; 210/289
[58] Field of Search ................ 55/47, 53, 174, 201;
     210/73 W, 188, 218, 232, 238, 274, 282, 287,
     289, 456

[56] References Cited

U.S. PATENT DOCUMENTS

| | | | |
|---|---|---|---|
| 1,488,697 | 4/1924 | Moffat | 210/177 |
| 1,698,890 | 1/1929 | McGill | 210/206 |
| 1,797,709 | 3/1931 | Apeldorn | 210/289 X |
| 2,353,433 | 7/1944 | Auberschek | 210/238 |
| 2,579,053 | 12/1951 | Schulstadt | 210/289 X |
| 3,631,983 | 1/1972 | Mail | 210/274 X |
| 3,992,297 | 11/1976 | Baughcom et al. | 210/188 X |

FOREIGN PATENT DOCUMENTS

| | | | |
|---|---|---|---|
| 1,027,051 | 3/1958 | Germany | 210/188 |
| 92,368 | 5/1938 | Sweden | 210/282 |

Primary Examiner—Frank A. Spear, Jr.
Assistant Examiner—Robert H. Spitzer
Attorney, Agent, or Firm—Clarence A. O'Brien; Harvey B. Jacobson

[57] ABSTRACT

An elongated horizontal housing is provided including a pair of longitudinally spaced interior baffles dividing the interior of the housing into first, second and third compartments spaced longitudinally therealong. Filter material is disposed between the baffles and the latter are each provided with a plurality of spaced apertures for the passage of water therethrough. The housing includes outlet structure for the discharged water from the third compartment and the first compartment includes water and air inlet structure operative to admit jets of water and jets of air under pressure into the first compartment in a manner thoroughly commingling jets of water and air. Still further, the housing includes an air vent for venting air from the upper portion of the first compartment.

7 Claims, 5 Drawing Figures

SULFUR GAS REMOVING AND SOLID PARTICLE FILTER FOR WELL WATER

BACKGROUND OF THE INVENTION

Deep water wells often produce water contaminated with sulfur gas and other impurities. While various structures have been heretofore designed to remove, substantially, sulfur gas and other impurities from the water being pumped from deep wells, most of these previously known devices involve assemblages which are quite bulky, require excessive amounts of energy or considerable maintenance. Accordingly, a need exists for an apparatus which will be capable of removing sulfur gas from the water pumped at the deep water well and which will also be capable of filtering other impurities out of the water.

Examples of various structures designed to purify water as well as other assemblages including some of the general structural and operational features of the instant invention are disclosed in U.S. Pat. Nos. 1,488,697, 1,698,890, 3,003,580, 3,193,989, 3,417,015, 3,558,482 and 3,844,743.

BRIEF DESCRIPTION OF THE INVENTION

The filter of the instant invention includes structure whereby a plurality of jets of water pumped from a deep well are thoroughly commingled with a plurality of jets of air under pressure and the jets of water and air are impacted against a splash plate to effect further commingling of the air and water, and the air is thereafter vented from the water after which the water passes through a filter body for removing solids and other impurities therefrom. As a result of the deep well water being thoroughly commingled with jets of air under pressure and impacted against a splash plate, substantially all of the gas, a major portion of which may comprise sulfur gas, is driven from the water and whatever small quantity of sulfur gas remains in the water is highly diluted by the air under pressure commingled with the water.

The filter of the instant invention comprises a relatively small horizontally elongated housing into one end of which the jets of water and air are introduced and the housing includes longitudinally spaced foraminated baffles or partitions spaced from the opposite ends of the housing and between which a filter material is disposed. The end of the housing into which the jets of water and air are introduced is vented to the ambient atmosphere to allow escape of the air introduced into the housing and the fluid flow characteristics of the foraminated baffles is such that water may flow therethrough at a rate greater than the rate at which water is introduced into the housing.

The main object of the invention is to provide a structure by which water from a deep well may be freed, substantially, of sulfur gas and be filtered to remove other impurities.

Another object of this invention is to provide a filter which may be readily utilized between a deep well and a storage tank into which water from the deep well is to be pumped.

Yet another object of this invention is to provide a filter construction which will be operative over extended periods of time without requiring maintenance.

Yet another very important object of this invention is to provide a filter construction constructed in a manner whereby it may be readily serviced when servicing is required.

A final object of this invention to be specifically enumerated herein is to provide a filter construction in accordance with the preceding objects and which will conform to conventional forms of manufacture, be of simple construction and dependable in operation so as to provide a device that will be economically feasible, long lasting and relatively trouble free.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the filter assembly of the instant invention interposed in a water line leading from a deep well to a water supplied tank or the like;

DETAILED DESCRIPTION OF THE INVENTION

Figure 1:
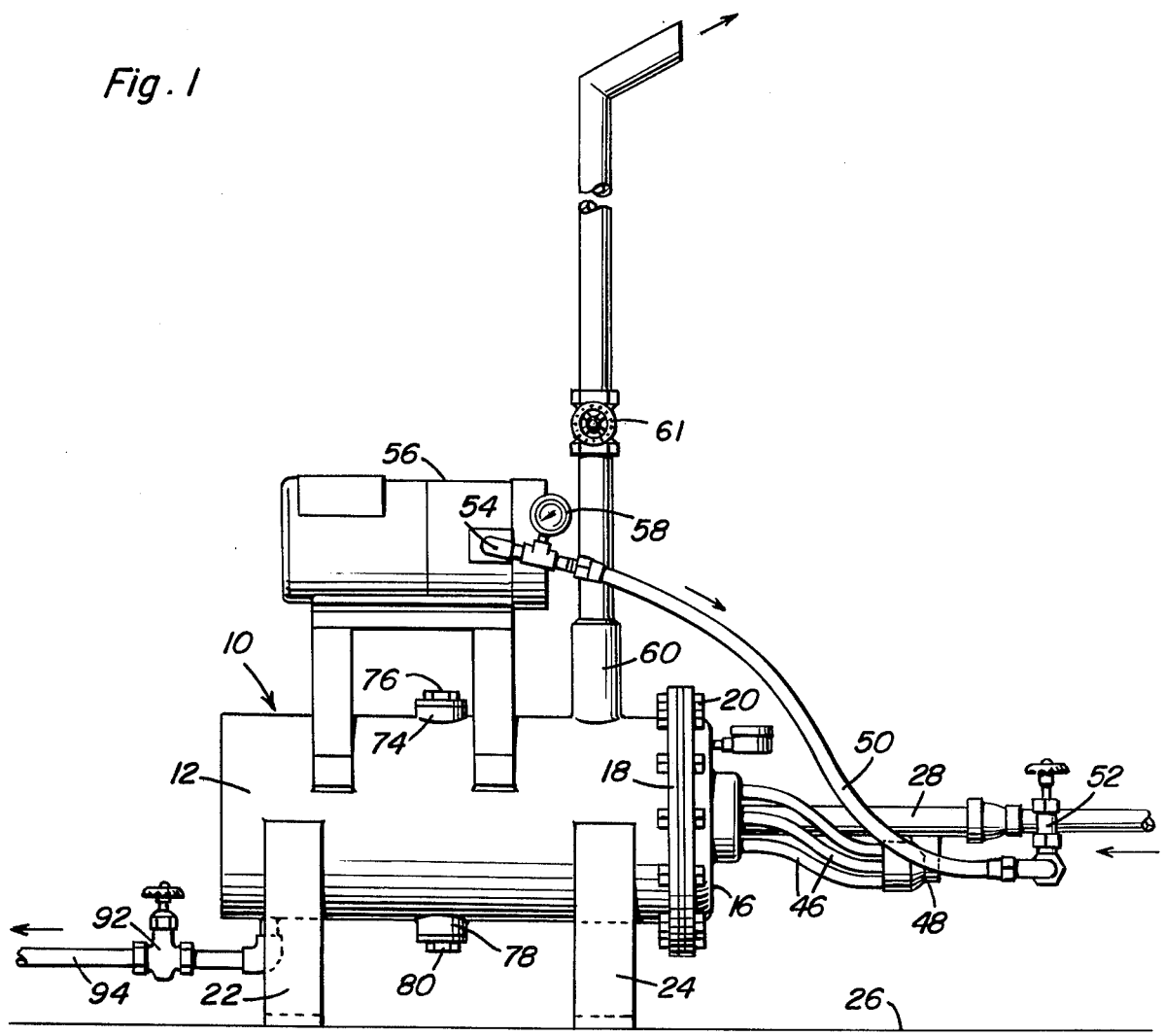
Figure 5:
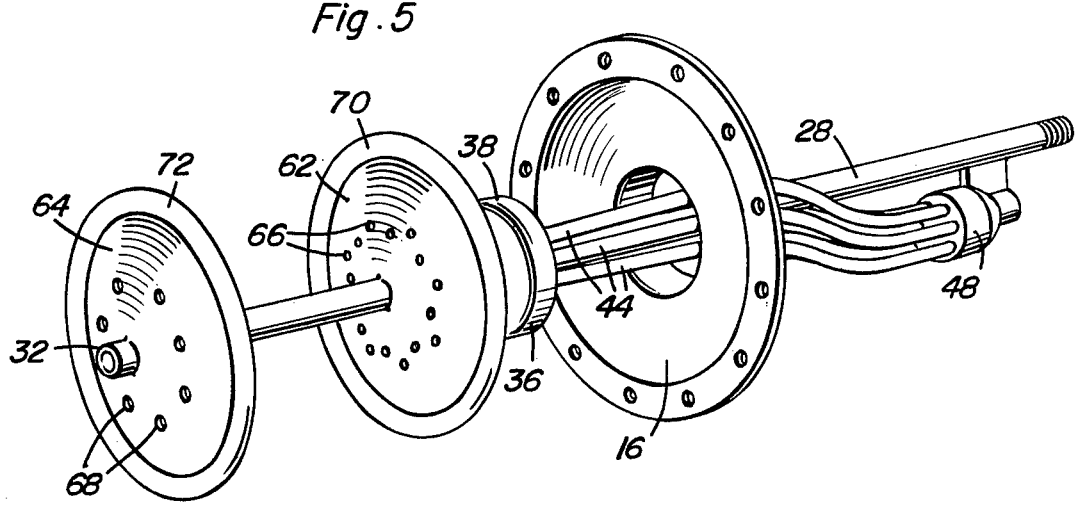
FIG. 5 is an exploded perspective view of the inlet end wall of the filter assembly, the water feed pipe for the filter assembly, internal baffles of the filter assembly supported from the water feed pipe and the compressed air inlet pipes.
Figure 2:
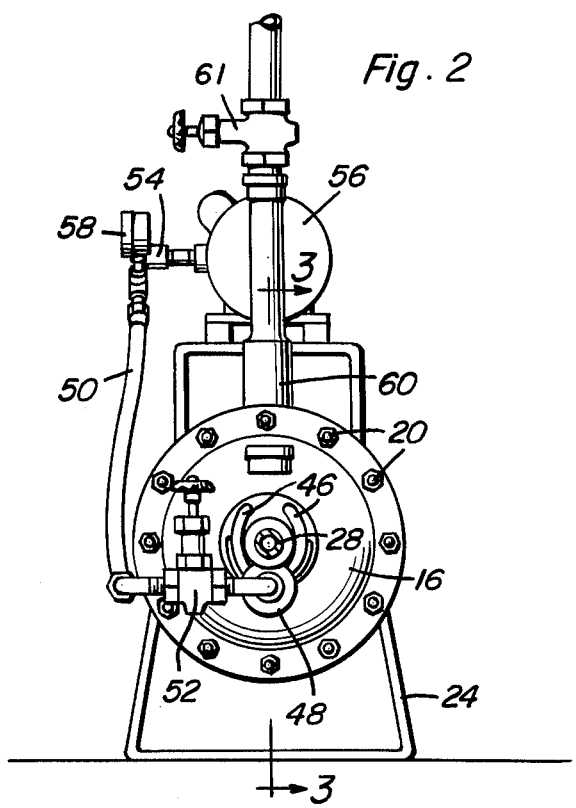
FIG. 2 is an end elevational view of the assemblage illustrated in FIG. 1 as seen from the right side thereof.
Figure 4:
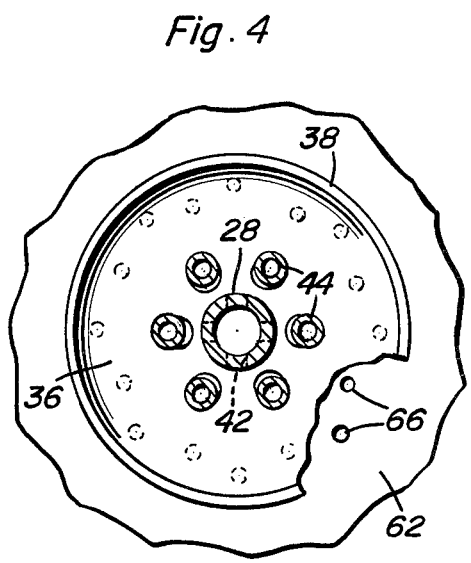
FIG. 4 is an enlarged fragmentary transverse vertical sectional view taken substantially upon the plane indicated by the section line 4—4 of FIG. 3.
Figure 3:
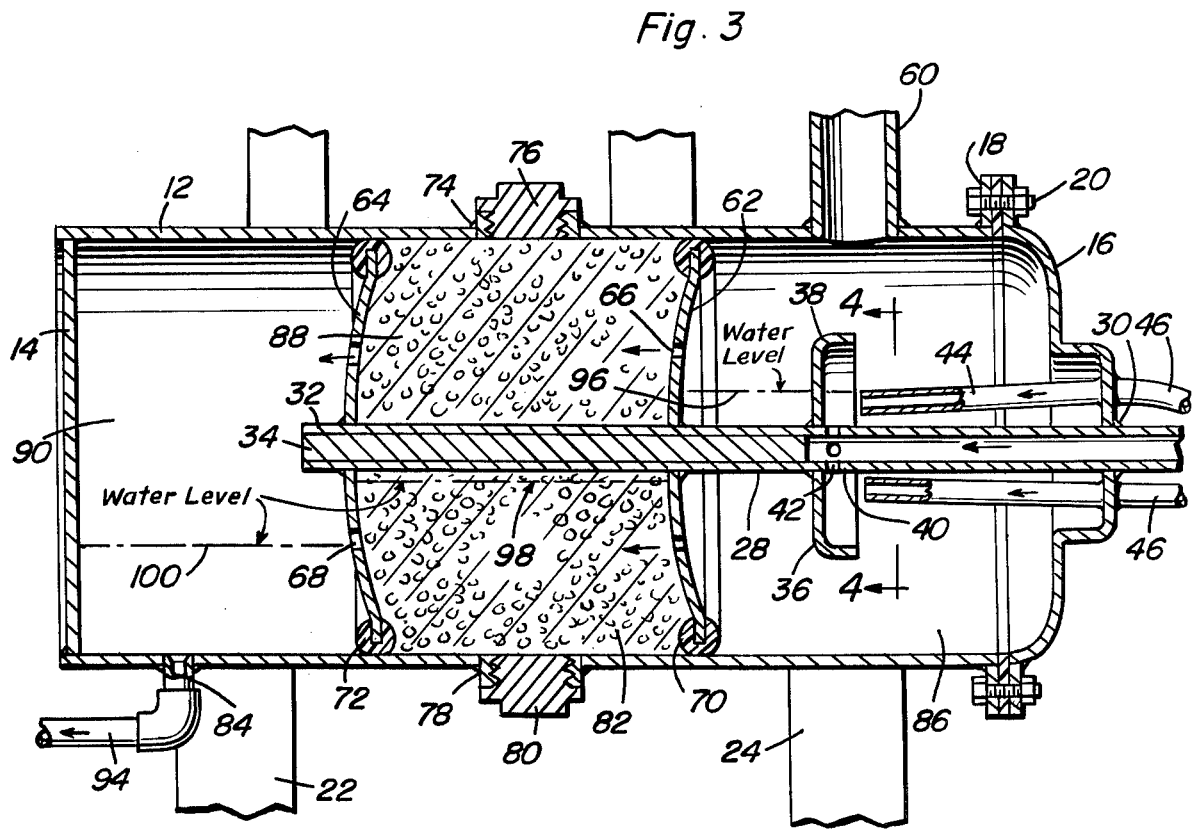
FIG 3 is an enlarged fragmentary longitudinal vertical sectional view taken substantially upon the plane indicated by the section line 3—3 of FIG. 2.

Referring now more specifically to the drawings, the numeral 10 generally designates the filter construction of the instant invention. The filter construction 10 includes an elongated horizontally disposed generally cylindrical housing 12 including a fixed end wall 14 at one end and a removal end wall 16 at the other end removably secured to a mounting flange 18 of the housing 12 by means of suitable fasteners 20. The housing 12 includes depending leg structures 22 and 24 by which the filter construction 10 may be supported from a suitable support surface 26. The removable end wall 16 has the discharge end of a pressurized water supply pipe 28 secured therethrough as at 30 in a fluid-type manner. The end portion 32 of the pipe 28 which projects into the housing 12 through the end wall 16 is plugged by means of a plug structure 34 and a generally circular splash disc 36 is mounted on the supply pipe 28 adjacent but spaced from the end of the plug 34 adjacent the end wall 16. The splash disc 36 includes a cylindrical outer rim 38 whereby the disc 36 opens toward the inner surface of the end wall 16. The short section 40 of the pipe 28 disposed within the disc 36 is provided with circumferentially spaced radial apertures 42 and the discharge end portions 44 of six air lines 46 are secured through the end wall 16 in fluid-type sealed engagement therewith at points spaced generally equally about the supply pipe 28. The discharge end portions 44 are slightly convergent toward their outlet end portions and the latter terminate substantially at the open side of the disc-shaped splash plate 36.

The inlet ends of the air lines 46 open into a manifold 48 to which air is supplied through an air line 50 having a control valve 52 therein. The inlet end of the air line 50 is connected to the outlet 54 of an electric motor driven air compressor 56 and the air line 50 has an air pressure gauge 58 connected therein.

The end portion of the housing 12 in which the splash plate or disc 36 is disposed includes a vertically extending vent pipe 60 for venting air from the upper portion of the housing 12 and the vent pipe 60 includes a control valve 61 connected therein.

The plugged end portion 32 of the supply pipe 28 extending inwardly beyond the splash plate or disc 36 includes a pair of slightly dished circular baffle plates 62 and 64 supported therefrom at points spaced longitudinally therealong and the plate 62 includes a plurality of apertures 66 formed therethrough while the plate 64 includes a plurality of apertures 68 formed therethrough. The circular outer peripheries of the plates 62 and 64 include sealing rings 70 and 72 supported therefrom which are snugly but slidably received within the housing 12. Accordingly, upon removal of the end wall 16 the entire assembly including the end wall 16, the supply pipe 28, the baffle plates 62 and 64, the splash disc 36 and the discharge end portions 44 of the air lines 46 may be withdrawn from the housing 12 through the end thereof normally closed by means of the end wall 16.

The upper periphery of the housing 12 disposed between the baffle plates 62 and 64 includes an inlet neck 74 closed by means of a threaded plug 76 and the lower periphery of the housing 12 between the baffle plates 62 and 64 includes an outlet neck 78 closed by means of a threaded plug 80. A quantity of granular filter material 82 is disposed between the plates 62 and 64 within the housing 12 and may be admitted into the latter through the inlet neck 74 and discharged from the housing 12, when desired, through the outlet neck 78, The end of the housing on the side of the baffle plates 64 remote from the baffle plate 62 includes a lower peripheral outlet 84 from which water may drain by gravity from the housing 12 or be pumped therefrom into a water storage tank.

In operation, water from a deep well and containing sulfur gas as well as other impurities is pumped from the well and into the supply pipe 28. The water enters the housing 12 through the supply pipe 28 and is discharged through the apertures 42 radially outwardly of the pipe 28 within the cup-shaped splash disc 36 and impacts with the outer rim 38. However, air under pressure is supplied from the compressor 56 and passes through the air line 50 to the manifold 48 and is thereafter passed into the housing 12 through the air lines 46 and discharged from discharge end portions 44 of the lines 46 for thoroughly commingling with the water being discharged from the apertures 42. In addition, the commingled water and air jets impact with the splash disc 36 to further enhance commingling of the air and water and substantially all of the sulfur gas within the water is driven therefrom. Any small quantity of sulfur gas remaining in the water is quite extensively diluted by air within the water as a result of its aeration. The water then flows from the first compartment 86 within the housing 12 between the end wall 16 and the baffle plate 62 through the apertures 66 and into the second compartment 88 within the housing 12 between the baffle plates 62 and 64. Of course, the passage of water through the filter material 82 results in various other impurities being filtered from the water. Then, the water passes through the baffle plate 64 by means of the apertures 68 and into the third compartment 90 within the housing 12 between the end wall 14 and the baffle plate 64. The water then drains from the third compartment 90 through the outlet 94 or is pumped therefrom and into a suitable storage tank.

The various valves 52, 61 and the valve 92 disposed in the line 94 extending from the fitting 84 are adjusted whereby the water level within the compartment 86 will be substantially that designated by the reference numeral 96, the water level within the compartment 88 will be substantially that designated by the numeral 98 and the water level in the compartment 90 will be substantially that designated by the numeral 100.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A combined sulfur gas removing and solid particle filtering assembly for well water, said assembly including a hollow housing having interior baffle plates dividing the interior of said housing into first, second and third compartments, means operative to discharge water from said third compartment, each of said baffle plates defining spaced water flow openings therethrough for the flow of water from the first compartment through the second compartment and into the third compartment, water filtering material disposed in said second compartment for filtering water flowing therethrough, and water and air inlet means for said first compartment operative to admit jets of water and jets of air under pressure into the first compartment in a manner to thoroughly commingle said jets of water and air, said first compartment also including air vent means operatively associated therewith for venting air from an upper portion of said first compartment, said housing being elongated and said compartments are spaced longitudinally therealong, said housing including one removable end wall, said baffle plates and water and air inlet means being supported from said removable end wall for removal from said housing with said end wall, said water inlet means including a water supply pipe having its discharge end extending and secured through said end wall, the terminal end portion of said pipe being plugged and having said baffles mounted thereon for support therefrom, said pipe having a cup-shaped splash plate mounted thereon between said end wall and the adjacent baffle and opening toward said end wall, water outlet ports formed in said pipe and opening outwardly thereof into said cup-shaped splash plate, said air inlet means including a plurality of compressed air pipe discharge end portions spaced about said water pipe and opening toward and into said splash plate from the side of said water outlet ports remote from the closed end of said splash plate.

2. The combination of claim 1 wherein said housing is substantially cylindrical in interior shape.

3. The combination of claim 2 wherein said baffle plates are generally circular and include outer peripheral seal means extending thereabout disposed in slidable sealed engagement with the opposing interior surfaces of said housing.

4. The combination of claim 3 wherein said housing includes upper and lower removably closed ports formed therein between said baffle plates through which a fluent filter material may be withdrawn from between said baffle plates and replenished within said housing.

5. A combined sulfur gas removing and solid particle filtering assembly for well water, said assembly including a hollow housing having interior baffle plates dividing the interior of said housing into first, second and third compartments, means operative to discharge water from said third compartment, each of said baffle plates defining spaced water flow openings therethrough for the flow of water from the first compartment through the second compartment and into the third compartment, water filtering material disposed in said second compartment for filtering water flowing therethrough, and water and air inlet means for said first compartment operative to admit jets of water and jets of air under pressure into the first compartment in a manner to thoroughly commingle said jets of water and air, said first compartment also including air vent means operatively associated therewith for venting air from an upper portion of said first compartment, said water inlet means including a water supply pipe having a discharge end portion opening through said housing and into said first compartment, the terminal end of said discharge end portion being plugged, said discharge end portion having a cup-shaped splash plate mounted thereon between said terminal end and the portion of said housing through which said discharge end portion opens, said splash plate opening toward said housing portion, said pipe having water outlet ports formed therein and opening outwardly thereof into said cup-shaped splash plate, said air inlet means including a plurality of compressed air pipe discharge end portions spaced about said water pipe and opening toward and into the open side of said cup-shaped splash plate.

6. The combination of claim 5 wherein said housing is substantially cylindrical in interior shape, said baffle plates being generally circular and including outer peripheral seal means extending thereabout disposed in slidable sealed engagement with the opposing interior surfaces of said housing, one end of said housing being closed by a removable end wall thereof and through which said baffle plates are removable when said end wall has been removed.

7. The combination of claim 6 wherein said water supply pipe extends through said end wall and said baffle plates are mounted on said water supply pipe.

* * * * *